US009612326B2

(12) United States Patent
Herbel et al.

(10) Patent No.: US 9,612,326 B2
(45) Date of Patent: Apr. 4, 2017

(54) METHODS AND APPARATUS FOR DETECTION SYSTEM HAVING FUSION OF RADAR AND AUDIO DATA

(71) Applicant: RAYTHEON COMMAND AND CONTROL SOLUTIONS LLC, Fullerton, CA (US)

(72) Inventors: Richard S. Herbel, Anaheim, CA (US); James W. Rakeman, Brea, CA (US)

(73) Assignee: RAYTHEON COMMAND AND CONTROL SOLUTIONS LLC, Fullterton, CA (US)

( * ) Notice: Subject to any disclaimer, the term of this patent is extended or adjusted under 35 U.S.C. 154(b) by 744 days.

(21) Appl. No.: 14/068,318

(22) Filed: Oct. 31, 2013

(65) Prior Publication Data

US 2016/0223662 A1    Aug. 4, 2016

(51) Int. Cl.
| | |
|---|---|
| *G01S 13/86* | (2006.01) |
| *F41G 3/14* | (2006.01) |
| *G01S 3/802* | (2006.01) |
| *G01S 13/66* | (2006.01) |

(52) U.S. Cl.
CPC .............. *G01S 13/86* (2013.01); *F41G 3/147* (2013.01); *G01S 3/802* (2013.01); *G01S 13/66* (2013.01)

(58) Field of Classification Search
CPC ...................................................... G01S 13/86
USPC ......... 342/52, 67, 95–97, 139–141, 145–147
See application file for complete search history.

(56) References Cited

U.S. PATENT DOCUMENTS

| | | | | |
|---|---|---|---|---|
| 3,699,341 | A | * | 10/1972 | Quillinan ................. H04N 3/09 250/330 |
| 4,825,216 | A | | 4/1989 | DuFort |
| 5,703,321 | A | * | 12/1997 | Feierlein ................. F42B 12/36 102/427 |
| H1916 | H | | 11/2000 | Hollander |
| 6,215,731 | B1 | * | 4/2001 | Smith ..................... F41H 11/00 367/128 |

(Continued)

FOREIGN PATENT DOCUMENTS

| | | | | |
|---|---|---|---|---|
| FR | WO 0165197 | A1 * | 9/2001 | ............... F41G 3/04 |
| NO | EP 2793043 | A1 * | 10/2014 | ........... G01S 3/8083 |
| WO | WO 2013055422 | A2 * | 4/2013 | ............. F41G 3/147 |

OTHER PUBLICATIONS

P. Thumwarin, N. Wakayaphattaramanus, T. Matsuura and K. Yakoompai, "Audio forensics from gunshot for firearm identification," Information and Communication Technology, Electronic and Electrical Engineering (JICTEE), 2014 4th Joint International Conference on, Chiang Rai, 2014, pp. 1-4.*

(Continued)

*Primary Examiner* — John B Sotomayor
(74) *Attorney, Agent, or Firm* — Daly, Crowley, Mofford & Durkee, LLP

(57) ABSTRACT

Methods and apparatus for locating a weapon by fusing audio and radar data. An exemplary embodiment comprises detecting a weapon firing event with an audio sensor system, detecting a projectile fired from the weapon with a radar system, calculating a state vector associated with the projectile detection, identifying a location of the weapon by backtracking the state vector to the detected time of the weapon firing event time, and communicating the location of the weapon.

12 Claims, 6 Drawing Sheets

(56) References Cited

U.S. PATENT DOCUMENTS

| | | | | |
|---|---|---|---|---|
| 6,621,764 B1* | 9/2003 | Smith | | F41H 11/00 367/128 |
| 6,823,621 B2 | 11/2004 | Gotfried | | |
| 6,839,025 B1* | 1/2005 | Reigle | | G01S 3/14 342/417 |
| 6,903,676 B1* | 6/2005 | Frady | | F41H 11/00 342/52 |
| 7,151,478 B1 | 12/2006 | Adams et al. | | |
| 7,239,975 B2 | 7/2007 | Coleman et al. | | |
| 7,239,976 B2 | 7/2007 | Coleman et al. | | |
| 7,277,046 B2 | 10/2007 | Adams et al. | | |
| 7,394,724 B1* | 7/2008 | Uzes | | G01S 3/04 367/134 |
| 7,532,542 B2 | 5/2009 | Baxter et al. | | |
| 8,050,141 B1* | 11/2011 | Carroll | | G01S 5/18 367/124 |
| 8,149,156 B1* | 4/2012 | Allred | | G01S 13/583 342/146 |
| 9,494,687 B2* | 11/2016 | Ell | | F41G 7/008 |
| 2006/0028373 A1 | 2/2006 | Fullerton et al. | | |
| 2006/0038678 A1* | 2/2006 | Avneri | | B61B 3/02 340/541 |
| 2008/0191926 A1* | 8/2008 | Benayahu | | F41H 7/00 342/52 |
| 2008/0291075 A1* | 11/2008 | Rapanotti | | F41G 3/02 342/20 |
| 2009/0009378 A1* | 1/2009 | Ilan | | G01S 7/40 342/13 |
| 2009/0260511 A1 | 10/2009 | Melnychuk et al. | | |
| 2009/0295624 A1* | 12/2009 | Tuxen | | G01S 13/58 342/147 |
| 2011/0127328 A1* | 6/2011 | Warren | | F41G 5/08 235/412 |
| 2012/0182837 A1* | 7/2012 | Calhoun | | G01S 5/20 367/127 |
| 2012/0211562 A1* | 8/2012 | Cook | | F41F 3/055 235/400 |
| 2013/0021194 A1* | 1/2013 | Harman | | G01S 13/003 342/104 |
| 2013/0293406 A1* | 11/2013 | Herman | | F41H 3/00 342/20 |
| 2014/0086454 A1* | 3/2014 | Bauer | | G01S 3/781 382/107 |
| 2014/0269199 A1* | 9/2014 | Weldon | | G01S 5/18 367/124 |
| 2016/0223660 A1* | 8/2016 | Hintz | | G01S 13/347 342/196 |
| 2016/0223662 A1* | 8/2016 | Herbel | | G01S 13/86 342/52 |
| 2016/0291117 A1* | 10/2016 | Hui | | G01S 3/802 |

OTHER PUBLICATIONS

"Boomerang: Beating The Ambush & Saving Lives", posted Sep. 1, 2007 by Patrick Durkin and filed under Tactical Weapons, Tactical Weapons Sep. 2007, 4 pages, www.tactical-life.com.

Notification of Transmittal of the International Search Report and the Written Opinion of the International Searching Authority, or the Declaration, PCT/US2012/047011, Date of Mailing Apr. 26, 2013, 4 pages.

Written Opinion of the International Searching Authority, PCT/US2012/047011, Date of Mailing Apr. 26, 2013, 7 pages.

U.S. Appl. No. 13/550,892, filed Jul. 17, 2012, 80 pages.

U.S. Appl. No. 13/550,892, filed Jul. 17, 2012, Rakeman.

* cited by examiner

METHODS AND APPARATUS FOR DETECTION SYSTEM HAVING FUSION OF RADAR AND AUDIO DATA

BACKGROUND

Radar systems transmit electromagnetic radiation and analyze reflected echoes of returned radiation to determine information about the presence, position, and motion of objects within a scanned area. Conventional weapon locating systems include a radar system that can detect and track projectiles, such as artillery projectiles, to determine the location of the fired weapon. This determination can be based on an extrapolation of estimated state vectors, derived by radar tracking of a ballistic target, to a point of intersection. Identified coordinates associated with the intersection point approximate the location of the weapon that launched the projectile.

When the elevation angle of the bore of the fired weapon is small relative to the local earth tangent plane, conventional weapon locating systems are generally unable to accurately determine the location of the weapon. Such low angle trajectories produce exaggerated errors in the state vector estimates. As the angle of elevation approaches zero, the intersection point on the terrain becomes indeterminate. At low angle trajectories, weapon location determination is also limited because projectile detection and tracking by radar systems can be limited by impaired lines of sight, radar multipath echoes, and clutter. In addition, the short track life of near-in fire with low angle trajectories creates difficulties in discriminating false targets. When the location of the firing weapon cannot be accurately determined, the ability to return precision counter fire or launch rockets at the firing weapon is impaired.

SUMMARY

Exemplary embodiments of the present invention provide method and apparatus to detect the firing location of weapons that fire projectiles with low angle trajectories. In exemplary embodiments, audio sensor information is fused with radar data to enhance the ability of the system to locate the location of a projectile firing system, such as a rocket. While exemplary embodiments of the invention are shown and described in conjunction with certain components, configurations, weapons, and the like, it is understood that alternative embodiments within the scope of the present invention will be apparent to one of ordinary skill in the art.

In one aspect of the invention, a method of locating a weapon comprises: detecting a weapon firing event with an audio sensor system, the detected weapon firing event indicative of a detected firing of the weapon and indicative of a detected time of the weapon firing event, detecting a projectile fired from the weapon with a radar system, calculating a state vector associated with the projectile detection, identifying a location of the weapon by backtracking the state vector to the detected time of the weapon firing event time, and communicating the location of the weapon.

The method can further include one or more of the following features: generating a common time base for the weapon firing event and for the projectile detection, the audio sensor system comprises an audio sensor, the audio sensor system is directional and provides at least one of an azimuth angle of the detected weapon firing event or an elevation angle of the detected weapon firing event, the step of detecting the weapon firing event with the audio sensor system comprises detecting the weapon firing event by direct path detection of audio generated by the weapon firing event, correlating the weapon firing event detected by the audio sensor system with the detection of the projectile by the radar system to determine if the weapon firing event detected by the audio sensor system corresponds to the same projectile as that detected by the radar system, wherein the correlating comprises: selecting a time difference threshold, and relating the time difference threshold to a difference between the detected time of the weapon firing event detected by the audio sensor system and a time of the detection of the projectile by the radar system, the correlating comprises: selecting a time difference threshold, and relating the time difference threshold to a difference between a time predicted by the state vector when backtracked to a terrain and the detected time of the weapon firing event detected by the audio sensor system, the correlating comprises: selecting a position difference threshold, and relating the position difference threshold to a difference between a location predicted by the state vector when backtracked to a terrain and a location predicted by the state vector when backtracked to the detected time of the weapon firing event detected by the audio sensor system, the correlating comprises: selecting an angle difference threshold, and/or relating the angle difference threshold to a difference between an angle to the projectile identified by the radar system and an angle to the weapon identified by the audio sensor system.

In another aspect of the invention, a weapon locating system comprises: an audio sensor system configured to detect a weapon firing event, the detected weapon firing event indicative of a detected firing of the weapon and indicative of a detected time of the weapon firing event, a radar system configured to detect a projectile fired from the weapon, a processor configured to calculate a state vector associated with the projectile detection and to backtrack the state vector to the detected time of the weapon firing event to identify the location of the weapon, and a communication system configured to communicate the location of the weapon.

The system can further include one or more of the following features: the processor is further configured to correlate the weapon firing event detected by the audio sensor system with the detection of the projectile by the radar system to determine if the weapon firing event detected by the audio sensor system corresponds to the same projectile as that detected by the radar system, the processor is further configured to select a time difference threshold, and relate the time difference threshold to a difference between the detected time of the weapon firing event detected by the audio sensor system and a time of the detection of the projectile by the radar system, the processor is further configured to select a time difference threshold, and relate the time difference threshold to a difference between a time predicted by the state vector when backtracked to a terrain and the detected time of the weapon firing event detected by the audio sensor system, the processor is further configured to select a position difference threshold, and relate the position difference threshold to a difference between a location predicted by the state vector when backtracked to a terrain and a location predicted by the state vector when backtracked to the detected time of the weapon firing event detected by the audio sensor system, and/or the processor is further configured to select an angle difference threshold, and relate the angle difference threshold to a difference between an angle to the projectile identified by the radar system and an angle to the weapon identified by the audio sensor system.

In a further aspect of the invention, an article comprises: at least one computer-readable medium containing non-transitory stored instructions that enable a machine to perform: detecting a weapon firing event with an audio sensor system, the detected weapon firing event indicative of a detected firing of the weapon and indicative of a detected time of the weapon firing event, detecting a projectile fired from the weapon with a radar system, calculating a state vector associated with the projectile detection, identifying a location of the weapon by backtracking the state vector to the detected time of the weapon firing event time, and communicating the location of the weapon. The article can further include instructions for correlating the weapon firing event detected by the audio sensor system with the detection of the projectile by the radar system to determine if the weapon firing event detected by the audio sensor system corresponds to the same projectile as that detected by the radar system.

BRIEF DESCRIPTION OF THE DRAWING

The accompanying drawings illustrate embodiments of the devices and methods disclosed herein and together with the description, serve to explain the principles of the present disclosure.

DETAILED DESCRIPTION

Figure 1:
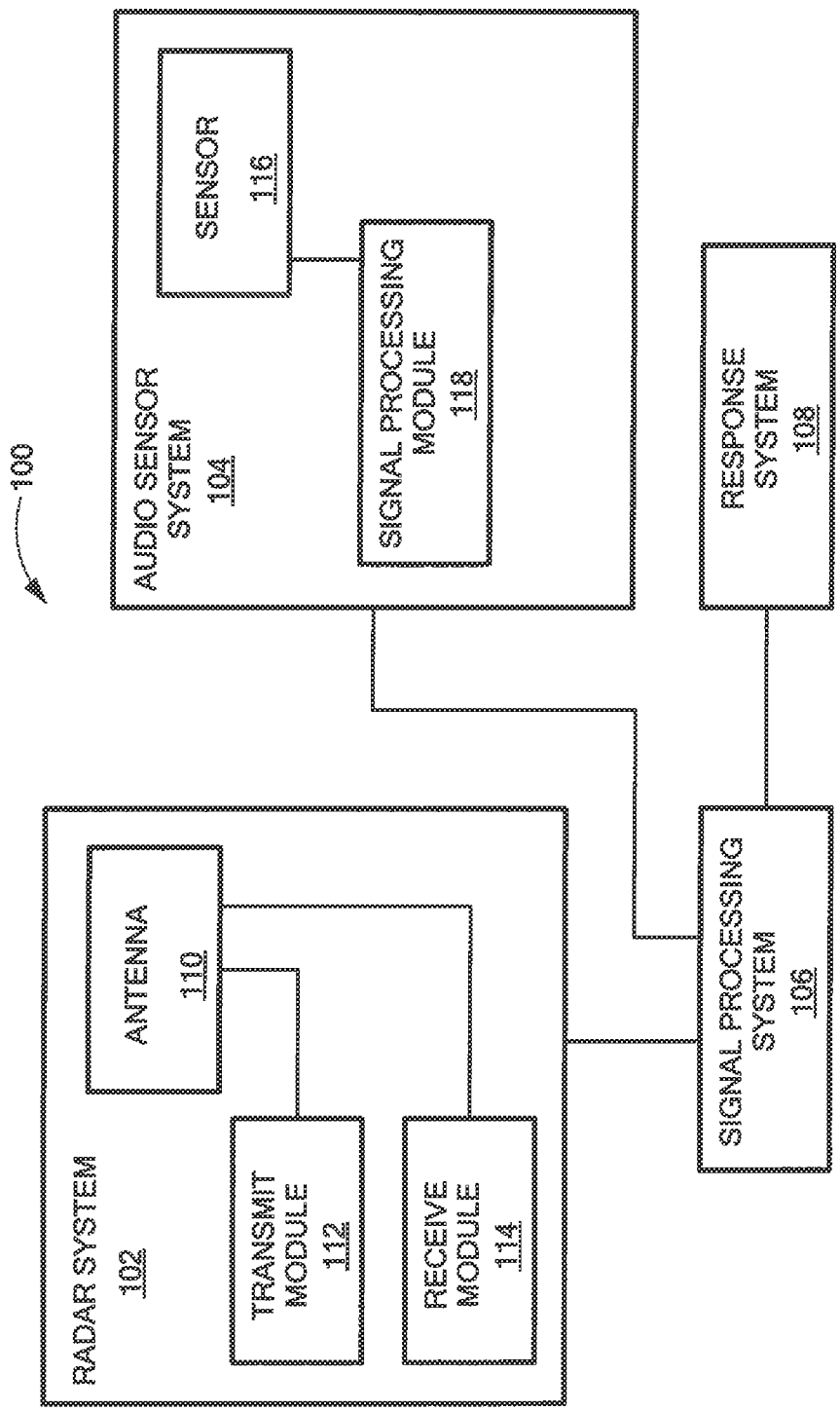
FIG. 1 is a schematic diagram illustrating a weapon locating system according to an embodiment of the present invention.

FIG. 1 shows an exemplary weapon locating system 100 including a radar system 102 and an audio sensor system 104 that communicate signals to a signal processing system 106. The signal processing system 106 can transmit information derived from the received signals to a response system 108.

As described in more detail below, a conventional weapon locating system having only a radar system can experience a reduced accuracy when detecting and tracking weapons fired at low quadrant elevations (QE). Quadrant elevation (QE) is a commonly used artillery term to describe the angle between the gun or launchers elevation angle and local horizontal. However when a conventional weapon locating system is combined with an audio sensor system, data generated by the combination of systems (i.e., an audio augmented weapon locating system) can be processed to more accurately determine the location of the fired weapon, particularly at low quadrant elevations (QEs).

The radar system 102 can be capable of detecting and tracking one or more projectiles fired from a weapon. In some embodiments, the radar system 102 can be a phased array radar system, also known as an electronically scanned array ("ESA"), which is a type of radar system that uses multiple antennas to transmit and/or receive radiofrequency (RF) signals at shifted relative phases. The phase shifting thus allows the transmitted and/or received RF energy to be transmitted and/or received as transmit and/or received beams that can be electronically "steered" without the need to physically move components of the radar system. Examples of such a phased array radar system used in a conventional non-augmented weapon locating system include the AN/TPQ-36 and the AN/TPQ-37 Firefinder Weapon Locating Systems manufactured by Raytheon Company of Waltham, Mass.

In some embodiments, the phased array can be comprised of transmit and/or receive elements disposed within a common assembly. In some other embodiments, the phased array can be comprised of transmit and/or receive antennas that a spatially separated and not disposed within a common assembly. Although phased array radar systems can be an effective choice for the radar system 102, other types of radar systems may also be suitable. The radar system 102 can be stationary or mounted on a mobile platform.

In one embodiment, the radar system 102 includes an antenna system 110, one or more transmitters 112, and one or more receivers 114. In some embodiments, the transmit and receive functions can be provided by a combined transmit/receive module. While not shown for clarity, it will be understood that the radar system 102 can also include various components such as controllers, duplexers, oscillators, mixers, amplifiers, synchronizers, modulators, antenna positioning systems, power supply systems, data storage devices, and signal pre-processing equipment.

The audio sensor system 104 can comprise any type of sensor system capable of detecting and processing sound information. For example, the audio sensor system 104 can include one or more transducers 116 sensitive to sound information for a given frequency range. It is understood that a series of transducers optimized for particular frequency ranges can be used to cover a desired aggregate frequency range. A signal processing module 118 can process the sensor information, as described more fully below.

A variety of sound sensor types can be used. The sensors may be located on the radar or the sensors may be located to form a network of sensors for determining the azimuth and elevation of a projectile solution. It is understood that the temperature and humidity of the environment can be used to calculate the speed of sound. In one embodiment, the system can process audio profiles of different types of devices to determine the type of device fired. Such profiles can be stored in a database, for example.

As used herein, the term "state vector" is used to describe a collection of parameters (i.e., one or more parameters) that correspond to set of characteristics of a moving projectile. The one or more state parameters within a state vector can include, but are not limited to, a position (in a coordinate system), a time, a speed, a heading (or three dimensional velocity vector), and acceleration in one or more dimensions, of the moving projectile.

As used herein, the term "backtracking" is used to describe a process by which one or more state vectors, each describing one or more parameters associated with a projectile at a respective one or more positions along a trajectory, can be extrapolated backward in time and space to identify a state vector associated with the projectile at an earlier point along the trajectory. The state vector at the earlier time and space can include both an earlier time and a location of the projectile at the earlier time. As used herein, the term "terrain" is used to describe topographical characteristics of the earth's surface. The terrain can be represented by numerical values.

In general, electromagnetic radiation is classified by wavelength into radio, microwave, infrared, visible, ultraviolet, X-rays, and gamma rays, in order of decreasing wavelength. As used herein, the term "light" is used to describe at least electromagnetic radiation having a wavelength in the infrared, visible, or ultraviolet portions of the electromagnetic spectrum. Similarly, the term "optical" is used herein to describe a system or component (e.g., sensor that interacts with or that processes the infrared, visible, or ultraviolet portions of the electromagnetic spectrum. As used herein, "sound" is used to describe as vibrations that travel through the air or another medium.

Figure 2:
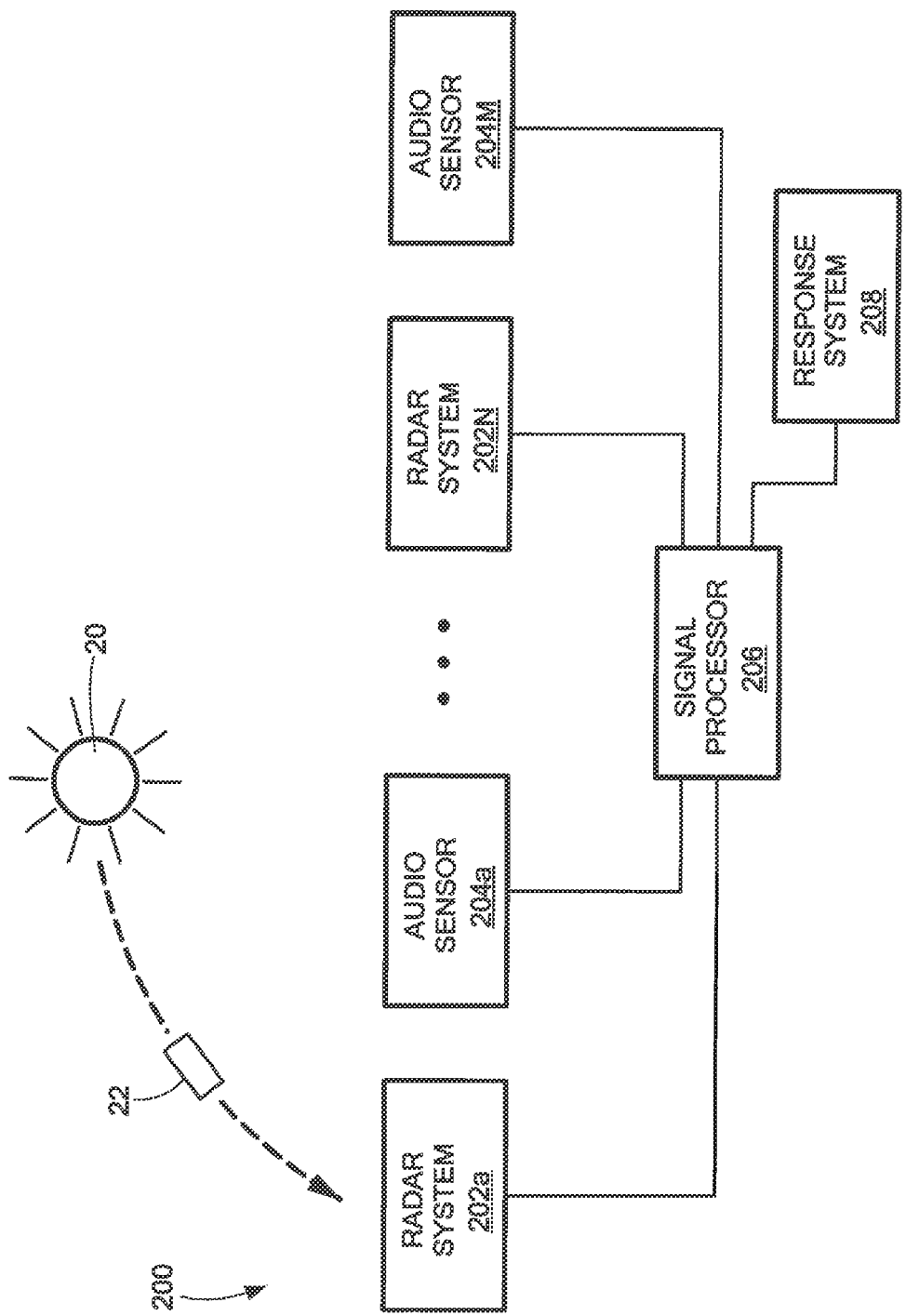
FIG. 2 is schematic diagram of a weapon locating system according to an embodiment of the present invention.

FIG. 2 shows an exemplary system 200 having at least one radar system 202a-N and at least one audio sensor system 204a-M. The radar systems 202 and audio sensor systems 204 are coupled to a signal processor 206 that can fuse the radar and audio sensor information to locate a weapon system 20 firing a projectile 22. The signal processor 206 can generate an output signal indicative of one or more of a time of a detected firing event, an azimuth bearing of the detected firing event, or an elevation angle of the detected firing event.

In one embodiment, the audio sensor systems 204 are located proximate or attached to a respective radar system. In an alternative embodiment, the audio sensors are located at locations separated from the radar systems. In one embodiment, audio sensors systems 204 can be launched and/or dropped in the area suspected to contain a weapon system. The audio sensors 204 can include a GPS receiver to determine its location and report this and other information to the signal processor 206 or other entity. In other embodiments, audio sensors are remote from other components of the audio sensor systems.

The signal processing system 206 can include one or more computer processors, a data storage system, an output interface, a network interface, and software for processing the signals received from the audio sensor system(s) 204 and the radar system(s) 202. Other hardware, firmware, and software can also be incorporated into the signal processing system 206. The signal processing system 206 can also include a communication system for transmitting, via either wired or wireless connection, data to a response system. The communicated data may include a set of fired weapon location coordinates.

The response system 208 can include, for example, a counter fire weapon system capable of returning fire to the location of the fired weapon, a friendly fire detection system capable of determining the location of allied forces, or a threat assessment system for use by peace-keeping or law enforcement agencies to determine a location for follow-up investigation or patrol.

As described more fully below, the weapon locating system 200 can be used to determine a location from which a weapon is fired. The weapon may fire any type of projectiles including shells, shot, missiles, or rockets.

Figure 3:
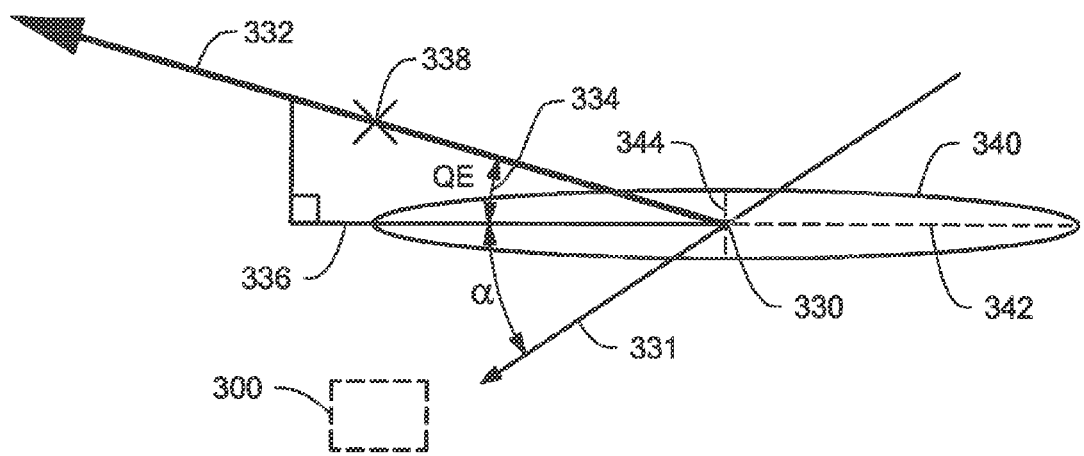
FIG. 3 is a diagram illustrating the trajectory of a projectile fired from a weapon.

Referring now to FIG. 3, when a weapon fires a projectile from a location 330, the projectile follows a trajectory 332. While the trajectory is shown to be a straight line, it will be understood that the trajectory need not be a straight line.

A quadrant elevation (QE) is an angle between an axis 336 upon a horizontal plane and an axis of a bore of the weapon fired from the location 330. A firing azimuth, α, is an angle formed between an axis 331 between the firing location 330 and the radar system 102 (of the weapon locating system 100) and the axis 336.

Acquisition, i.e. detection and tracking, of the fired projectile by the radar system 102 can occur at a location 338 along the trajectory 332. Associated with the location 338, the radar system 102 can generate a state vector that describes one or more characteristics of the projectile and of the trajectory of the projectile. The radar system 102 can make other detections at other points along the trajectory and can form other associated state vectors.

Conventionally, without use of the audio sensor system 104, the radar system 102 and signal processing system 106 can backtrack the resulting one or more state vectors to identify a state vector that intersects the terrain. Conventionally, the intersection can identify the location 330 of the weapon that fired the projectile. However, particularly at low QE, the identification of the location 330 is not precise.

An error associated with the radar system 102 (without use of the audio sensor system 104 (and neglecting radar ranging errors that are generally small compared to angular errors) can be characterized as an "error ellipse" 340 lying along the line-of-fire having a down range error component $\sigma_{DOWN}$ 342 and a cross range error component $\sigma_{CROSS}$ 344. The error components 342, 344 of the error ellipse 340 can be calculated as follows:

$$\sigma_{DOWN} = \sqrt{\frac{VR \cdot \sigma_\varepsilon^2 + \sigma_{\varepsilon-bias}^2}{\tan^2(QE)} + (VRR \cdot \sigma_\eta^2 + \sigma_{\eta-bias}^2)\sin^2(\alpha)}$$

$$\sigma_{CROSS} = \sqrt{(VR \cdot \sigma_\eta^2 + \sigma_{\eta-bias}^2)\cos^2(\alpha)}$$

$$VRR = \frac{1 + 12\left(\frac{N-1}{N+1}\right)\left(\frac{T_{BACK}}{T_{TRACK}} + 0.5\right)^2}{N}$$

where:
$\sigma_\varepsilon$=random component (1 sigma) of the estimated target height in meters;
$\sigma_{\varepsilon-bias}$=bias component of the estimated target height in meters;
$\sigma_\eta$=random component (1 sigma) of the estimated azimuth error in meters;
$\sigma_{\eta-bias}$=bias component (1 sigma) of the estimated azimuth error in meters;
α=firing azimuth angle in radians;
VR=VRR (in this example a single filter type is used);
VRR=Variance reduction from filter smoothing (non-dimensional);
$T_{BACK}$=the total time the projectile is tracked by the radar in seconds;
$T_{TRACK}$=that portion of the projectile flight time where extrapolation is required in seconds;
N=number of measurements processed by the radar.

As can be seen from the equations above, as QE becomes a small angle and approaches zero (i.e. direct fire), error in locating the fired weapon using the radar system 102, particularly the down range error component $\sigma_{DOWN}$ 342, becomes greatly exaggerated and approaches infinity. Minimizing the error components improves the accuracy with which the weapon firing location 330 can be determined.

Figure 4:
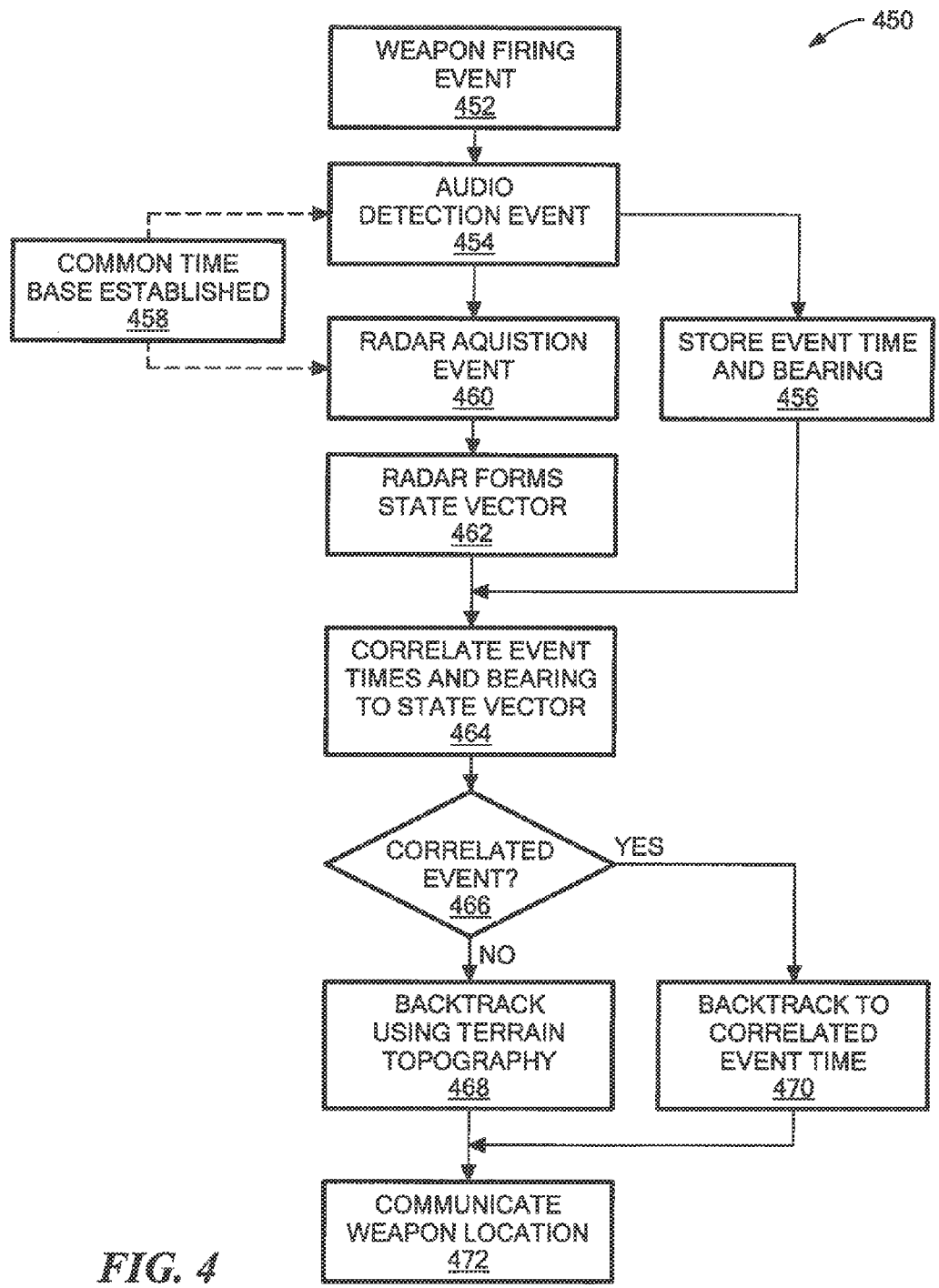
FIG. 4 is a flowchart illustrating a method of locating a weapon using an audio augmented weapon locating system having a radar system in combination with an audio sensor system according to an embodiment of the present invention.

FIG. 4 shows an exemplary sequence of steps 450 for determining the location of a weapon firing system by combining radar and audio sensor information in accordance with exemplary embodiments of the invention.

As further discussed above, conventional backtracking of a state vector associated with a sequence of radar measurements backtracks the state vector until the backtracked state vector intersects a position in space identified by the backtracked state vector intersecting the terrain. The intersection in space can provide, within the intersecting state vector, a prediction in space of a location of a weapon, and also a prediction in time of when the weapon was fired. In contrast, techniques described below can backtrack the state vector until the backtracked state vector intersects a time identified by the backtracked state vector intersecting a time identified by the above-described audio sensor system 104. This intersection in time can also provide, within the intersecting state vector, a prediction in space of a location of the weapon and also a prediction in time (known by the audio sensor detection in time) of when the weapon was fired.

Thus, both the conventional non-augmented weapon locating system and the audio-augmented weapon locating system can provide both a prediction of a location of a weapon and either a prediction of or knowledge of, a time of firing of the weapon.

In step 452, a weapon firing event occurs, resulting in sound that propagates both directly and indirectly from the weapon to the audio sensor system, for example, to the audio sensor system 104 of FIG. 1. The sound tends to have a time duration in accordance with the type of weapon fired. For example, if the sound occurs due to a gun firing event, the sound can have a duration in the order of milliseconds. The sound can result from an explosive event, e.g., a gunshot, or a controlled firing event, e.g., a rocket, etc.

In general, the beginning of the sound is indicative of a weapon firing event, however, for some types of weapon firing events, it may be desirable to mark the time of the weapon firing event as being a bit later in time, for example, if the sound is generated by a prolonged rocket blast and the projectile is a rocket that accelerates relatively slowly.

The audio sensor system 104 may use the time duration of the audio event to classify the event as to the sound's source. The time history may be used to discriminate out non-firings or to classify the firing event as to type (e.g., rocket, mortar, artillery, etc.). When classification data is available to the radar system 102, the radar system can use the classification data to improve ballistic estimator performance through better modeling of the projectile, to adjust the projectile's firing time to reflect the time the projectile actually began to leave the lunch platform (for example, rockets may require time to build thrust) and to eliminate possible false radar detections.

At step 454, an audio detection of a weapon firing event occurs where the audio sensor system. 104 detects the sound associated with the weapon firing event 452. At step 456, the time of the detection event 454 can be stored, for example in a memory device associated with the audio sensor system 104 or with the signal processing system 106. In some embodiments, the audio sensor system 104 is directional, in which case, a bearing (i.e., direction) associated with the detection event can also be stored. The audio sensor system 104 may have directional measurement capability in both bearing and elevation. When the audio sensor system 104 can measure direction, a means of aligning the audio system with the radar is provided. For example, a microphone array can perform beamforming to determine event direction.

At step 458, a common time base for the radar system 102 and for the audio sensor system 104 is established, for example using a global positioning system (GPS), inter-range instrumentation group (IRIG) time codes, or still another type of common clock. The common clock can be absolute or relative. This synchronization of the times for the systems 102, 104 will generally occur before the weapon firing event 452 and can be scheduled to occur with regularity so that the systems stay synchronized.

At step 460, a radar acquisition event, i.e., a radar detection of a projectile, occurs in which state information, such as altitude, speed, direction, acceleration, and time, associated with the projectile at the location 338 (FIG. 3) along the trajectory 332 (FIG. 3) is collected. The radar acquisition event, i.e., the radar detection, can occur after the weapon firing event detected by the audio sensor system 1-4 at block 454.

At step 462, the radar system 102, either alone or together with the signal processing system 106, forms a state vector using the state information associated with the projectile at location 338. At step 464, a correlation between the audio detection event 454 and the radar acquisition event 460 is made, if possible, using the stored event time and, in some embodiment, bearing data.

The correlation can be made in a number or ways. For example, in some embodiments, the correlation is made by comparing the time of the audio detection event with a time of the radar detection. A time difference threshold can be established based upon the environment (i.e., the application) in which the system is used, and any time difference less than the time difference threshold can be indicative of a correlation. For example, if the system is used to detect locations of missile firing events, the time difference threshold can be relatively large, for example, 5 seconds. For another example, if the system is used to detect locations of close range gun firing events, the time difference threshold can be relatively small, for example, 0.1 seconds. Other time difference thresholds are possible.

As described above and further below, backtracking the state vector in steps below provides both a weapon firing location estimate and a firing time estimate.

In other embodiments, correlation can be established by comparing the time of the weapon firing event detected by the audio sensor system 104 (FIG. 1) with a time of the radar detection of the projectile when the state vector of the projectile is conventionally backtracked to intersect the terrain. A time difference threshold can be established based upon the environment (i.e., the application) in which the system is used, and any time difference less than the time difference threshold can be indicative of a correlation. For example, if the system is used to detect locations of missile firing events, the time difference threshold can be relatively large, for example, 5 seconds. For another example, if the system is used to detect locations of close range gun firing events, the time difference threshold can be relatively small, for example, 0.1 seconds. Other time difference thresholds are possible.

In other embodiments, correlation can be established by comparing results of the conventional backtracking of the radar state vector to intersect the terrain with the backtracking described herein and below that backtracks the radar state vector to a point in time (and resulting space) established by the audio sensor system 104. As described above, both methods generate a prediction of a position from which the weapon was fired. A position difference threshold can be established based upon the environment (i.e., the application) in which the system is used, and any position difference less than the position difference threshold can be indicative of a correlation. Other position difference thresholds are possible.

With regard to the above correlation that backtracks the state vector in conventional and also in audio enhanced ways, from discussion above, it will be understood that, for low QEs, the conventional method to estimate weapon position may have very large errors, thus the above correlation using a position difference threshold may only apply to QEs above a threshold QE.

In still other embodiments for which the audio sensor system 104 provides directional information, e.g., azimuth bearing and/or elevation angle of a detected firing event, correlation can be established by comparing the azimuth bearing and or the elevation angle reported by the audio sensor system 104 with the azimuth bearing and/or the elevation angle reported by the radar system 102. An azimuth angle difference threshold and/or an elevation angle difference threshold can be established based upon the environment (i.e., the application) in which the system is used, and any azimuth angle difference and/or elevation angle difference less than azimuth angle difference threshold and/or elevation angle difference threshold can be indicative of a correlation. For example, if the system is used to detect locations of missile firing events, the azimuth angle difference threshold and/or the elevation angle difference threshold can be relatively large, for example, both 10.0 degrees. For another example, if the system is used to detect locations of close range gun firing events, the azimuth angle difference threshold and/or the elevation angle difference threshold can be relatively small, for example, both 1.0 degrees. Other angle difference thresholds are possible.

It should be understood that any one or more of the above-described techniques can be used to identify a correlation between radar detected events and filing events detected by the audio sensor system 104. Some correlations can be deemed to be primary and others can be deemed to be secondary, in any combination. Other correlation techniques are also possible, including techniques that make use of the directional capability of some audio sensor systems.

At step 466, a determination is made as to whether the weapon firing event detected by the audio sensor system at block 454 and the radar acquisition event detected by the radar system 102 at block 460 correlate. If a correlation cannot be made, at step 468 a potential (and possibly less accurate) weapon firing location can be determined by conventionally backtracking the state vector until it intersects the terrain topography. Extrapolation techniques can be used to perform the backtracking.

If a correlation can be made, at step 470 a more accurate weapon firing location can be determined by the audio augmented weapon locating system 100 (FIG. 1) by backtracking the state vector, not to an intersection with the terrain, but instead to an intersection in time with the weapon firing event time identified by the audio sensor system 104. Extrapolation and/or interpolation techniques can be used to perform the backtracking. Geographic coordinates associated with the backtracked state vector at the weapon firing event time identified by the audio sensor system 104 are calculated to establish a likely location of the weapon that fired the projectile. This calculated location of the weapon is more accurate than that described above using the radar system 102 alone.

At step 472, the coordinates associated with the likely location of the fired weapon are communicated to the response system 108 (FIG. 1). The response system 108 can direct a counter fire weapon capable of returning fire to the location of the fired weapon. Alternatively, the response system 108 can associate the location of the fired weapon with friendly fire from allied forces for purposes of mapping the location of allied forces. In still another alternative, the response system 108 can map the location of the fired weapon for use by peace-keeping or law enforcement agencies to determine a geographic area for follow-up investigation or patrol.

Figure 5:
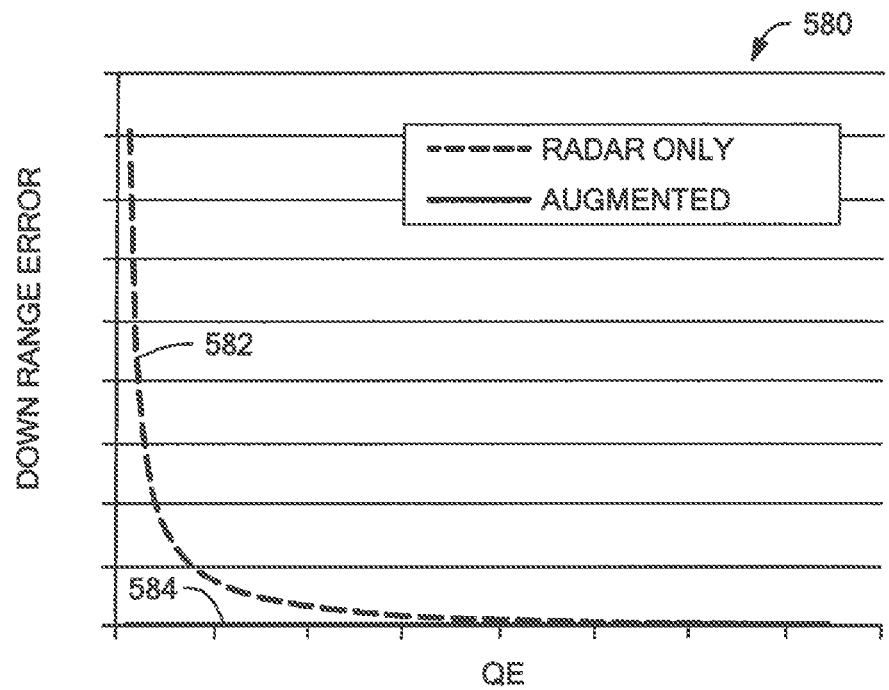
FIG. 5 is a graph of down range error for an audio augmented and non augmented conventional weapon locating systems at various quadrant elevations.

Referring now to FIG. 5, a graph 580 compares down range error at various quadrant elevations liar one example of a non-augmented conventional weapon locating system having only a radar system and one example of an audio augmented weapon locating system having both a radar system and an audio sensor system. Alternative embodiments of audio-augmented and non-augmented conventional weapon locating systems may result in different error responses. In the illustrative embodiment of FIG. 5, the plotted data set 582 shows a relationship between the QE of a firing weapon and the down range error component ($\sigma_{DOWN}$) associated with the use of a non-augmented conventional weapon locating system having the radar system 102 but not the audio sensor system 104. The graph 580 shows the general relationship between QE and down range error associated with the non-augmented conventional weapon locating system. As the QE of the firing weapon approaches 0, the error increases exponentially, rendering the non-augmented conventional weapon locating system relatively ineffectual in determining the location, of the firing weapon.

A plotted data set 582 shows a relationship between the QE of the fired weapon and the down range error component associated with the use of an audio augmented weapon locating system, e.g., 100 of FIG. 1, having both a radar system and an audio sensor system. The down range comparison graph 580 shows that backtracking the state vector of a projectile, as formed by a non-augmented conventional weapon locating system, to a time associated with a weapon firing event, as detected by an audio sensor system in an audio-augmented weapon locating system, results in improved weapon locating for low QE values of the firing weapon. It is understood that the results presented in FIG. 5 are just one example of audio-augmented and non-augmented conventional weapon locating system down range error values. For alternative embodiments, using different radar and audio sensor systems, the results may vary.

Figure 6:
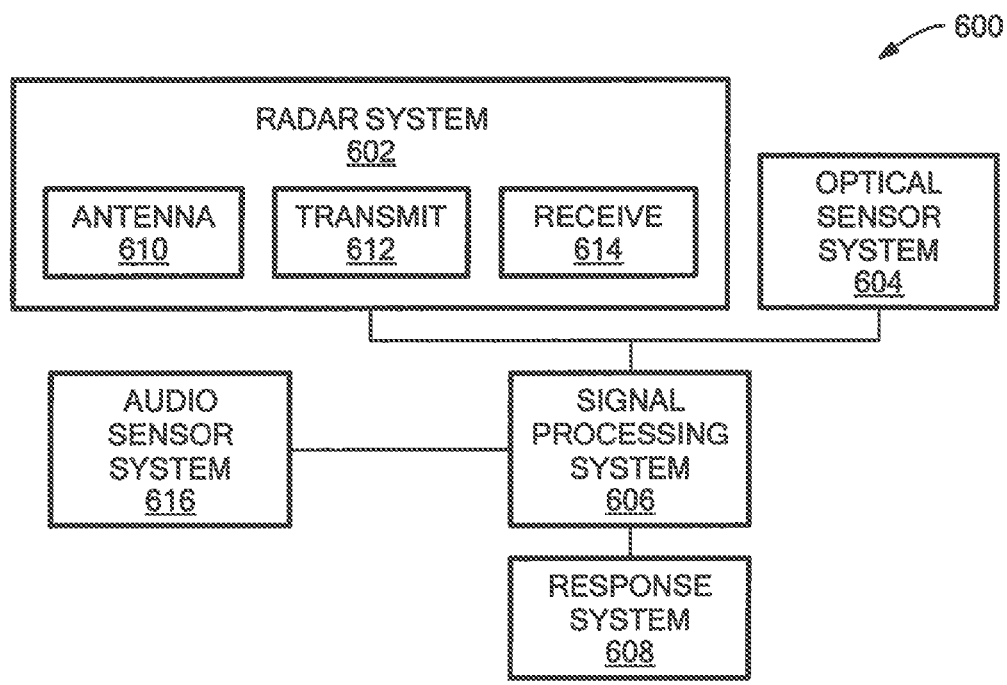
FIG. 6 is a schematic representation of an exemplary a weapon locating system combing optical and/or audio sensor data with a radar system.

FIG. 6 shows an exemplary weapon locating system 600 including a radar system 602 and an optical sensor system 604, both of which communicate signals to a signal processing system 606. The optical sensor system 604 and/or an audio sensor system 616 can provide information to the signal processing system 606. Optionally, the signal processing system 606 can transmit information derived from the received signals to a response system 608. The optical sensor system 604 is also referred to as an electro-optical (EO) system herein. The optical sensor system 604 can be any type of optical sensor system capable of detecting and processing light. For example, the optical sensor system 604 can comprise an electro optical (EO) sensor system.

Figure 7:
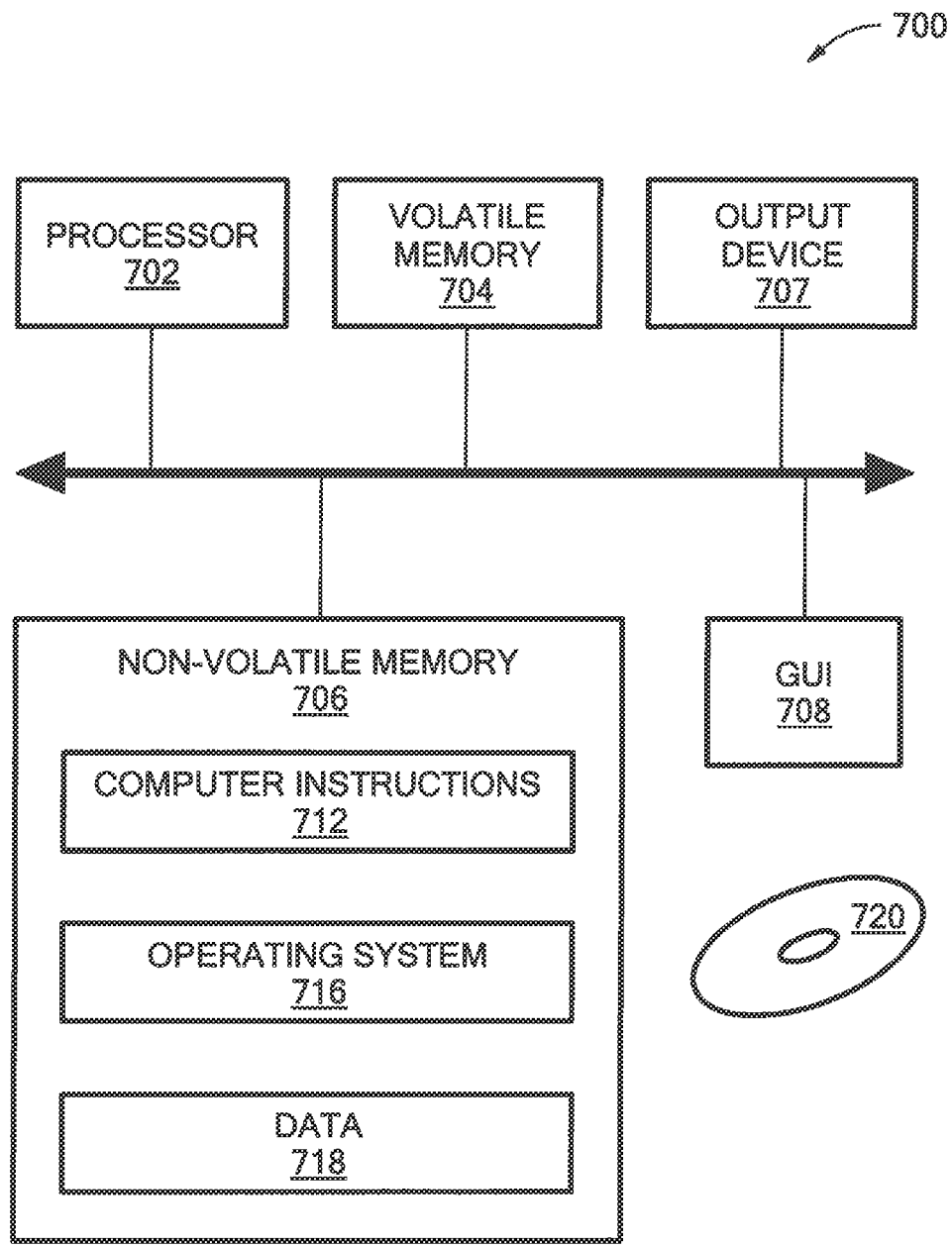
FIG. 7 is a schematic representation of an exemplary computer that can perform at least a portion of the processing described herein.

FIG. 7 shows an exemplary computer 700 that can perform at least part of the processing described herein. The computer 700 includes a processor 702, a volatile memory 704, a non volatile memory 706 (e.g., hard disk), an output device 707 and a graphical user interface (GUI) 708 (e.g., a mouse, a keyboard, a display, for example). The non-volatile memory 706 stores computer instructions 712, an operating system 716 and data 718. In one example, the computer instructions 712 are executed by the processor 702 out of volatile memory 704. In one embodiment, an article 720 comprises non-transitory computer-readable instructions.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate.

Processing may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

All references cited herein are hereby incorporated herein by reference in their entirety. Having described preferred embodiments, which serve to illustrate various concepts, structures and techniques, which are the subject of this patent, it will now become apparent to those of ordinary skill in the art that other embodiments incorporating these concepts, structures and techniques may be used. Accordingly, it is submitted that that scope of the patent should not be limited to the described embodiments but rather should be limited only by the spirit and scope of the following claims.

What is claimed is:

1. A method of locating a weapon, comprising:
   detecting a weapon firing event with an audio sensor system, the detected weapon firing event indicative of a detected firing of the weapon and indicative of a detected time of the weapon firing event;
   detecting a projectile fired from the weapon with a radar system;
   employing a processor configured for:
   correlating the weapon firing event detected by the audio sensor system with the detection of the projectile by the radar system to determine if the weapon firing event detected by the audio sensor system corresponds to the same projectile as that detected by the radar system, wherein the correlating comprises:
   selecting a time difference threshold; and
   relating the time difference threshold to a difference between the detected time of the weapon firing event detected by the audio sensor system and a time of the detection of the projectile by the radar system;
   calculating a state vector associated with the projectile detection;
   identifying a location of the weapon by backtracking the state vector to the detected time of the weapon firing event time; and
   communicating the location of the weapon.

2. The method of claim 1, further comprising generating a common time base for the weapon firing event and for the projectile detection.

3. The method of claim 1, wherein the audio sensor system comprises an audio sensor.

4. The method of claim 1, wherein the audio sensor system is directional and provides at least one of an azimuth angle of the detected weapon firing event or an elevation angle of the detected weapon firing event.

5. The method of claim 1, wherein the step of detecting the weapon firing event with the audio sensor system comprises detecting the weapon firing event by direct path detection of audio generated by the weapon firing event.

6. A method of locating a weapon, comprising:
   detecting a weapon firing event with an audio sensor system, the detected weapon firing event indicative of a detected firing of the weapon and indicative of a detected time of the weapon firing event;
   detecting a projectile fired from the weapon with a radar system;
   employing a processor configured for:
   correlating the weapon firing event detected by the audio sensor system with the detection of the projectile by the radar system to determine if the weapon firing event detected by the audio sensor system corresponds to the same projectile as that detected by the radar system, wherein the correlating comprises:
   selecting a time difference threshold; and
   relating the time difference threshold to a difference between a time predicted by the state vector when backtracked to a terrain and the detected time of the weapon firing event detected by the audio sensor system;
   calculating a state vector associated with the projectile detection;
   identifying a location of the weapon by backtracking the state vector to the detected time of the weapon firing event time; and
   communicating the location of the weapon.

7. A method of locating a weapon, comprising:
   detecting a weapon firing event with an audio sensor system, the detected weapon firing event indicative of a detected firing of the weapon and indicative of a detected time of the weapon firing event;
   detecting a projectile fired from the weapon with a radar system;
   employing a processor configured for:
   correlating the weapon firing event detected by the audio sensor system with the detection of the projectile by the radar system to determine if the weapon firing event detected by the audio sensor system corresponds to the same projectile as that detected by the radar system, wherein the correlating comprises:
   selecting a position difference threshold; and
   relating the position difference threshold to a difference between a location predicted by the state vector when backtracked to a terrain and a location predicted by the state vector when backtracked to the detected time of the weapon firing event detected by the audio sensor system;
calculating a state vector associated with the projectile detection;
identifying a location of the weapon by backtracking the state vector to the detected time of the weapon firing event time; and
communicating the location of the weapon.

8. A method of locating a weapon, comprising:
detecting a weapon firing event with an audio sensor system, the detected weapon firing event indicative of a detected firing of the weapon and indicative of a detected time of the weapon firing event;
detecting a projectile fired from the weapon with a radar system;
employing a processor configured for:
correlating the weapon firing event detected by the audio sensor system with the detection of the projectile by the radar system to determine if the weapon firing event detected by the audio sensor system corresponds to the same projectile as that detected by the radar system, wherein the correlating comprises:
selecting an angle difference threshold; and
relating the angle difference threshold to a difference between an angle to the projectile identified by the radar system and an angle to the weapon identified by the audio sensor system;
calculating a state vector associated with the projectile detection;
identifying a location of the weapon by backtracking the state vector to the detected time of the weapon firing event time; and
communicating the location of the weapon.

9. A weapon locating system, comprising:
an audio sensor system configured to detect a weapon firing event, the detected weapon firing event indicative of a detected firing of the weapon and indicative of a detected time of the weapon firing event;
a radar system configured to detect a projectile fired from the weapon;
a processor configured to:
correlate the weapon firing event detected by the audio sensor system with the detection of the projectile by the radar system to determine if the weapon firing event detected by the audio sensor system corresponds to the same projectile as that detected by the radar system, wherein the correlating comprises:
selecting a time difference threshold; and
relating the time difference threshold to a difference between the detected time of the weapon firing event detected by the audio sensor system and a time of the detection of the projectile by the radar system; and
calculate a state vector associated with the projectile detection and to backtrack the state vector to the detected time of the weapon firing event to identify the location of the weapon; and
a communication system configured to communicate the location of the weapon.

10. An article, comprising:
at least one computer-readable medium containing non-transitory stored instructions that enable a machine to perform:
detecting a weapon firing event with an audio sensor system, the detected weapon firing event indicative of a detected firing of the weapon and indicative of a detected time of the weapon firing event;
detecting a projectile fired from the weapon with a radar system;
correlating the weapon firing event detected by the audio sensor system with the detection of the projectile by the radar system to determine if the weapon firing event detected by the audio sensor system corresponds to the same projectile as that detected by the radar system, wherein the correlating comprises:
selecting a time difference threshold; and
relating the time difference threshold to a difference between the detected time of the weapon firing event detected by the audio sensor system and a time of the detection of the projectile by the radar system;
calculating a state vector associated with the projectile detection;
identifying a location of the weapon by backtracking the state vector to the detected time of the weapon firing event time; and
communicating the location of the weapon.

11. The method of claim 1, further including receiving data from an optical sensor system to identify the location of the weapon.

12. The system of claim 9, further including an optical sensor system coupled to the radar system.

* * * * *